United States Patent [19]

Giannini et al.

[11] 4,107,413
[45] Aug. 15, 1978

[54] PROCESS FOR THE STEREOREGULAR POLYMERIZATION OF ALPHA OLEFINS

[75] Inventors: Umberto Giannini; Antonio Cassata; Paolo Longi, all of Milan; Romano Mazzocchi, Pernate (Novara), all of Italy

[73] Assignee: Montedison S.p.A., Milan, Italy

[21] Appl. No.: 779,739

[22] Filed: Mar. 21, 1977

Related U.S. Application Data

[63] Continuation-in-part of Ser. No. 503,765, Sep. 6, 1974, abandoned, and Ser. No. 503,963, Sep. 6, 1974, abandoned, which is a continuation of Ser. No. 265,438, Jun. 23, 1972, abandoned, said Ser. No. 503,765, is a continuation of Ser. No. 265,503, Jun. 23, 1972, abandoned.

[30] Foreign Application Priority Data

Jun. 25, 1971 [IT] Italy ............................. 26275 A/71

[51] Int. Cl.$^2$ .......................... C08F 4/02; C08F 10/06
[52] U.S. Cl. ................................ 526/114; 252/429 B; 252/429 C; 526/97; 526/124; 526/125; 526/351; 526/906
[58] Field of Search ................................ 526/114, 125

[56] References Cited

U.S. PATENT DOCUMENTS

| | | | |
|---|---|---|---|
| 3,139,418 | 6/1964 | Marullo et al. | 526/141 |
| 3,219,648 | 11/1965 | Hill | 526/141 |
| 3,238,146 | 3/1966 | Hewett et al. | 526/125 |
| 3,502,634 | 3/1970 | Stedefeder et al. | 526/139 |
| 3,629,222 | 12/1971 | Coover et al. | 526/351 |
| 3,676,415 | 7/1972 | Diedrich et al. | 526/124 |

FOREIGN PATENT DOCUMENTS

| | | |
|---|---|---|
| 625,748 | 8/1961 | Canada. |
| 2,029,992 | 12/1970 | Fed. Rep. of Germany. |
| 1,958,046 | 6/1970 | Fed. Rep. of Germany. |
| 2,153,520 | 5/1972 | Fed. Rep. of Germany. |
| 2,230,728 | 12/1972 | Fed. Rep. of Germany. |
| 867,139 | 5/1961 | United Kingdom. |
| 918,740 | 2/1963 | United Kingdom. |

*Primary Examiner*—Edward J. Smith

[57] ABSTRACT

There is disclosed a process for the stereoregular polymerization of alpha olefins or mixtures thereof with ethylene conducted in the presence of highly active and stereospecific new catalysts.

The catalysts are obtained from the reaction of a component (A) which is a particular Al-alkyl compound that is at least in part in the form of an addition and/or a substitution reaction product with an electron-donor compound free from ester groups of oxygenated organic and inorganic acids, with a component (B) which is a supported component characterized by having surface area exceeding certain values or by showing a particular X-rays spectrum, and prepared by contacting a halogenated Ti compound, preferably in the form of a complex with an electron-donor compound, with a support comprising a Mg or Mn dihalide in an active state.

In the catalysts the ratio between the Ti compound expressed in Ti g-atoms and the g-moles of the electron-donor compounds is lower than 0.3.

34 Claims, No Drawings

4,107,413

PROCESS FOR THE STEREOREGULAR POLYMERIZATION OF ALPHA OLEFINS

This application is a continuation-in-part of our application Ser. No. 503,765, filed Sept. 6, 1974 now abandoned (as a continuation of our earlier application Ser. No. 265,503, filed June 23, 1972, now abandoned), and of our application Ser. No. 503,963, filed Sept. 6, 1974 now abandoned (as a continuation of our earlier application Ser. No. 265,438, filed June 23, 1972, now abandoned).

THE PRIOR ART

Highly active supported catalysts suitable for olefin polymerization and obtained from metallorganic compounds of the metals of Groups I to III of the Periodic System and Ti compounds supported on Mg or Mn dihalides present in an active form have been disclosed, for instance, in Belgian Pat. Nos. 742,003, 742,112 and 754,152.

These catalysts are highly active in the polymerization of ethylene.

When the catalysts are used for polymerizing alpha-olefins, in particular propylene, they produce predominantly amorphous atactic polymers.

It is known that the activity and/or stereospecificity of Ziegler and Ziegler-Natta catalysts can be modified by adding to the catalysts certain Lewis bases.

Generally the Lewis bases are used in the form of complexes with the Ti compound. However, catalysts are known in which the base can be used in an amount as high as to reach a 1:1 molar ratio with the Al compound.

When the polymerization of propylene is carried out with supported catalysts of the type described in the above mentioned Belgian patents, wherein the Ti compound is used in the form of a complex with a Lewis base, the stereospecificity of the catalyst is increased but the amount of the amorphous polymer is still too high. The thus modified supported catalysts do not find in practice any application in the polymerization of alpha-olefins.

In the Ziegler and Ziegler-Natta catalysts the molar ratio Al:Ti generally is not higher than 5–10:1. The preferred values range from 3:1 to 1:1.

When the ratios become as high as the ratios used in the supported catalysts wherein the amount of the Ti compound is very small in comparison with the Al-alkyl compound, the addition to the catalysts of a Lewis base has the effect of drastically lowering the activity of the catalysts.

From the above outlined behavior of the Ziegler and Ziegler-Natta catalysts modified with Lewis bases one would have expected that the sole way for obtaining supported catalysts still active and endowed with a certain stereospecificity was to use the Ti compounds in the form of a complex with a Lewis base.

THE PRESENT INVENTION

One object of this invention is to provide a process for the production with high yield of prevailingly isotactic polymers of alpha-olefins $CH_2 = CHR$, wherein R is an alkyl radical containing from 1 to 6 carbon atoms.

A particular object of the invention is to provide a process for the production with high yield of prevailingly isotactic polymers of propylene.

A further object is to provide a process for the production of prevailingly isotactic polymers of propylene having satisfactory impact resistance at low temperatures and containing 1–20% by weight of polymerized ethylene.

These and other objects are accomplished by the present invention in accordance with which the polymerization of the alpha-olefins and mixtures thereof with minor proportions of ethylene is conducted in the presence of the new catalysts herebelow disclosed.

As a peculiar characteristic these new catalysts associate very high activity with a remarkable stereospecificity.

Owing to this characteristic and in particular to the fact that the activity of the catalysts is not remarkably reduced by the presence of hydrogen as molecular weight regulator during the polymerization process, the new catalysts permit to avoid or at least to considerably simplify the onerous treatments hitherto necessary for purifying the polymers from the catalyst residues.

The catalysts used in the process of this invention are the product of the reaction between the following components (A) and (B):

(A) the addition and/or the substitution reaction product of an electron-donor compound (or Lewis base) free from ester groups of oxygenated organic and inorganic acids with an Al-trialkyl cmpound or the addition reaction product of an electron-donor compound free from ester groups of oxygenated organic and inorganic acids with an Al-alkyl compound containing two or more Al atoms linked together through an oxygen or a nitrogen atom, the reaction product (A) being characterized in that the Al organic compound present as addition compound with the electron-donor compound is comprised within the range from 0.01 to 1 mole of the starting Al-compound and in that the Al-compound present as substitution compound is from 0.01 to 0.9 mole per mole of the starting Al-compound; and (B) (1) the product formed from the contact of a halogenated compound of bi, tri or tetravalent Ti, preferably in the form of an addition compound, with an electron-donor compound, with a support formed of or comprising an anhydrous bihalide of Mg or Mn; or (2) the product formed from the contact of a halogenated bi, tri, or tetravalent Ti compound with a support which consists of or comprises the product obtained by reacting an addition compound of an anhydrous Mg or Mn bihalide and an electron-donor compound with an Al-alkyl compound.

In both embodiments (1) and (2) the Mg or Mn bihalide is in an active state such that the support and the component (B) are characterized in that they have surface area exceeding 3 $m^2/g$ or the component (B) is characterized in that in its X-rays powder spectrum the most intense diffraction lines characteristic of the X-rays powder spectrum of the normal, non-activated Mg or Mn bihalides are broadened; component (B) being further characterized in that the amount of the Ti-compound therein present, expressed as Ti metal, is less than 0.3 g atom per mole of the total amount of the electron-donor compound present in a combined form in the catalyst.

In one embodiment of the invention the electron-donor compound used to prepare component (A) of the catalyst is selected from the class of mono-amino compounds and the electron-donor compounds free of ester groups of oxygenated organic and inorganic acids. In another embodiment, the electron-donor used to prepare at least one of components (A) and (B) is selected from the class of polyamino compounds.

By the expression "addition or substitution reaction product" of an electron-donor compound with the Al-alkyl compound indicated sub (A) is intended the product formed of or comprising respectively a complex of the electron-donor compound with the Al-alkyl compound and the compound resulting from the reaction of an Al-trialkyl with an electron donor compound containing not more than one active hydrogen atom capable of reacting with the Al-trialkyl to give a substitution reaction represented, e.g., by the reaction:

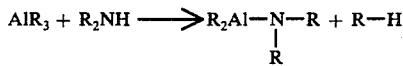

Any electron-donor compound (or Lewis base) of the classes indicated is suitable to prepare component (A) of the catalysts.

Preferably the component (A) is formed or comprises an addition compound (or complex) of the electron-donor compound with an Al-trialkyl compound.

Electron-donor compounds which can be employed for obtaining component (A) may be amines, amides, ethers, ketones, nitriles, phosphines, stibines, arsines, phosphoramides, thioethers, aldehydes, alcoholates, amides and salts of organic acids of metals of Group I, II, III and IV of the Periodic System. Examples of specific compounds are: pyridine, triethylamine, N,N,N',N'-tetramethylethylenediamine, N,N'-dimethylpiperazine, dimethylether, diethylether, dimethoxyethane, tetrahydrofuran, acetone, acetophenone, benzonitrile, acetonitrile, tetramethylurea, veratrol, nitrobenzene, Li-butylate, dimethylaminophenyllithium and Na dimethylamide.

Interesting results, as far as both the activity and stereospecificity of the catalyst are concerned, were obtained by using component (A) in the form of an addition product of an Al-trialkyl with the electron-donor compounds containing two or more donoratoms. Examples representative of said compounds are diethers like dimethoxyethane, phosphorus compounds like esamethylphosphorusamide; alkylureas like tetramethylurea.

As already indicated, in one embodiment of the invention, at least one of components (A) and (B) is prepared from a polyamino compound. Such embodiment, and in particular when no Ti-complexes with electron-donor compounds are used in preparing component (B), a polyamino compound must be used for preparing component (A). When a polyamino compound is used for preparing both components (A) and (B) no other electron-donor compounds are necessary.

Representative examples of polyamino compounds which can be used are the following: 1,2,4-trimethylpiperazine, N,N,N',N'-tetramethylethylenediamine, N,N,N',N'-tetraethylethylenediamine; N,N,N',N',-tetramethylmethylenediamine 2-dimethylamino-pyridine, N,N'-dimethylpiperazine, O-phenylendiamine, N,N'-dibenzylethylenediamine, N,N',N'-trimethyldiethylenetriamine, 2,3,N,N'-dimethylnaphthylenediamine.

The preferred polyamines are those containing tertiary amino groups. Besides the amino groups the polyamino compounds may contain other functional groups, as for instance the hydroxy groups, the keto groups, the nitro groups. Preferably the functional groups do not contain active hydrogen atoms.

Examples of substituted polyamino compounds are: 1,3-bis(dimethylamino) propanol-2; α,α'-ethylenediimodi(orthocresol). N'-(2-hydroxypropyl)-2-methyl-1,2-propano diamine. The preferred molar ratio base/Al-alkyl compound in the component (A) is lower than 1; more particularly is comprised between 0.3 and 0.5 when a polyamino compound is used for preparing component (A).

The following Al-trialkyl compounds are particularly suited for preparing component (A):
$Al(C_2H_5)_3$; $Al(CH_3)_3$; $Al(nC_3H_7)_3$ and $Al(iC_4H_9)_3$.

Examples of other Al-trialkyls are:

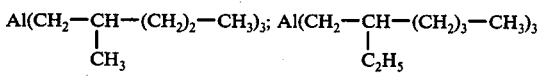

and $Al(C_{12}H_{25})_3$.

The metallorganic compounds which contain two or more Al atoms linked through an O or N atom obtained by reaction of an Al-trialkyl compound with water, ammonia or a primary amine, according to known methods.

Examples of such compounds are:
$(C_2H_5)_2Al—O—Al(C_2H_5)_2$;

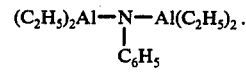

The component (A) of the catalyst can be obtained by several methods. The preferred consists in prereacting the electron-donor compound with the Al-organic compound in the adequate molar ratio before contacting (A) with component (B).

The starting molar ratio base/Al-organic compound varies in general from 0.01 to 1; however, ratios higher than 1 can be used when the enthalpy of formation of the addition compound is low as in the case of diphenyl ether and ethyl phenyl ether wherein the ratio can be as high as 1.5.

Another adequate method for preparing the component (A), which at the same time permits to obtain the Mg and Mn halide in an active form suited to prepare the catalysts according to this invention, consists in reacting an addition compound between the Mg or Mn halide and an electron-donor compound with an Al-trialkyl employed in such a quantity that the Al-trialkyl/base molar ratio is higher than 1.

According to another method, component (A) is formed in situ by reacting the Al-trialkyl compound with the component (B) and then adding the base in the quantity suited to form component (A).

The electron-donor compounds, which can be employed for preparing component (B) can be the same as those already indicated for the preparation of component (A) or different, except that in the embodiment in which at least one of components (A) and (B) is prepared from an electron-donor compound selected from the class of polyamino compounds, if the electron-donor compound used to prepare component (A) is not a polyamino compound, then an electron-donor compound which is a polyamino compound is used to prepare component (B). Otherwise, any electron-donor compound is suitable to prepare component (B), examples of which are: veratrol, ethyl benzoate, acetone, 2,5-hexanedione, dimethylmaleate, dimethylmalonate, tetrahydrofurfurylmethylether, nitrobenzene, diethyl carbonate, acetophenone, 1,2,4-trimethyl piperazine and ethyl acetate.

Particularly interesting results both with respect to the activity and stereospecificity of the catalyst are obtained using Ti complexes with a polyamino compound. Specific polyamino compounds which can be used are those specified hereinabove.

The Ti compounds which can be used to prepare component (B) include any halogenated compound of bi, tri or tetravalent Ti. Examples of such compounds are: $TiCl_4$, $TiCl_3$, $TiI_4$, $Ti(OC_3H_7)Cl_3$, $Ti(OC_4H_9)_2Cl_2$, $3TiCl_3 \cdot AlCl_3$, $Ti[O—C(CH_3) = CH—CO—CH_3]_2Cl_2$, $Ti[N(C_2H_5)_2]Cl_3$, $Ti[N(C_6H_5)_2]Cl_3$, $Ti(C_6H_5COO)Cl_3$, $[N(C_4H_9)_4]2TiCl_6$, $[N(CH_3)_4]Ti_2Cl_9$, $TiBr_4$, $TiCl_3OSO_2C_6H_5$, and $LiTi(OC_3H_7)_2Cl_3$.

The catalyst component (B) may also be prepared according to various methods.

One of these, consists in contacting the Mg or Mn halide, which preferably is present in a preactivated form, with the Ti compound previously complexed with the base and carrying out the contact under conditions at which the resulting product has surface area higher than 3 m$^2$/g and/or its X rays spectrum shows a broadening of the most intense diffraction lines characteristic of the X-ray spectrum of the normal non-activated Mg and Mn bihalides. This can be obtained e.g., by dry-milling the support in the presence of the Ti compound. Good results are also obtained by simply mixing the Ti compound with preactivated Mg or Mn bihalides having surface area exceeding 3 m$^2$/g.

According to another method, which allows to form the Ti addition compound "in situ", consists in adding the electron-donor compound suitable to form component (A) either before or after the addition of the Al-alkyl to the previously supported Ti compound.

Examples of addition Ti compounds are:

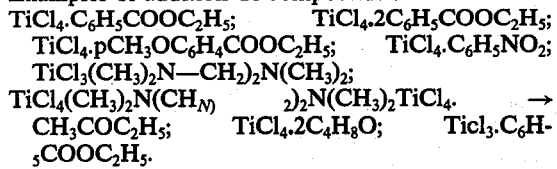

$TiCl_4 \cdot C_6H_5COOC_2H_5$; $TiCl_4 \cdot 2C_6H_5COOC_2H_5$; $TiCl_4 \cdot pCH_3OC_6H_4COOC_2H_5$; $TiCl_4 \cdot C_6H_5NO_2$; $TiCl_3(CH_3)_2N—CH_2)_2N(CH_3)_2$;
$TiCl_4(CH_3)_2N(CH_N)\quad _2)_2N(CH_3)_2TiCl_4$. →
$CH_3COC_2H_5$; $TiCl_4 \cdot 2C_4H_8O$; $TiCl_3 \cdot C_6H_5COOC_2H_5$.

Still another method of activating the Mg or Mn bihalide is to react the addition product thereof with an electron-donor compound with an Al alkyl compound.

The quantity of Ti compounds present on the support is generally comprised between 0.1 and 10% by weight expressed as Ti metal. The quantity of Ti compound present in the catalyst expressed as Ti metal is less than 0.3 g-atom per mole of the total amount of electron-donor compound present in combined form in the catalyst; preferably said quantity is less than 0.1 g-atoms and more particularly ranges from 0.05 to 0.005 g-atoms.

The Al/Ti molar ratio is generally comprised between 10 and 1,000.

Anhydrous compounds of elements of the Ist, IInd, IIIrd and IVth Groups of the (Mendelyeev) Periodic System different from the Mg and Mn bihalides may be mixed with the Mg or Mn bihalides before or during cogrinding thereof with the halogenated Ti compound, or before or during pre-activation thereof, without substantially reducing the activity of the catalyst obtainable therefrom, but with the advantage of diminishing or even annulling the negative effects of the high chloride contents on the polymer.

In order to avoid any substantial alteration in the catalyst activity, the above said anhydrous compounds of the Ist, IInd, IIIrd, and IVth group must not substantially interact with the Mg and Mn halides.

Typical examples of the above said compounds which may be employed are: LiCl, $CaCO_3$, $CaCl_2$, $SrCl_2$, $BaCl_2$, $Na_2SO_4$, $Na_2CO_3$, $TiO_2$, $Na_2B_4O_7$, $Ca_3(PO_4)_4$, $CaSO_4$, $BaCO_3$, $Al_2(SO_4)_3$, $B_2O_3$, $Al_2O_3$, $SiO_2$, etc.

The quantity of these substances, which can be incorporated into the Mg and Mn anhydrous bihalide, without substantially altering the activity of the catalyst obtained therefrom, may vary over a broad range which may be, e.g., from 30 to 70% by weight.

As already disclosed herein, the surface area of the support consisting of or comprising the activated anhydrous bihalide of Mg and Mn is larger than 3 m$^2$/g. Good results have been obtained with surface areas within the range 20–30 m$^2$/g.

It has been found, and this constitutes another aspect of the process of this invention, that the polymerization of propylene can be carried out in liquid phase in the substantial absence of inert diluents without appreciably reducing the isotacticity index of the polymer obtained. This result is unexpected and surprising since, operating with catalysts supported on $MgCl_2$ in which only the Ti compound is used in the form of a complex, the stereo-specificity of the catalyst is remarkably reduced when the polymerization is conducted in liquid propylene.

The use of liquid propylene permits on the other hand with respect to the process carried out in presence of an inert diluent to increase the polymerization rate, with a resulting higher hourly output of the polymerization reactors.

The conditions under which the polymerization of the alpha-olefins with the aid of these new catalysts is conducted are those known in the art. The polymerization is carried out at temperatures ranging from −80° C to 150° C, preferably from 0° C to 100° C, operating with partial pressures of the alpha-olefins higher than the atmospheric pressure. The polymerization can be carried out both in liquid phase in the presence, or in the absence, of an inert diluent, or in the gas phase.

The alpha-olefins comprise in general olefins $CH_2=CHR$ in which R is an alkyl radical containing 1–6 carbon atoms. Propylene, butene-1, 4-methylpentene-1 are examples of alpha-olefins. As herebefore indicated the process can be used to polymerize mixtures of alpha olefins with minor proportions of ethylene.

Examples of inert diluents are the $C_4$–$C_8$ aliphatic hydrocarbons typical of which are n-hexane, n-heptane, the cycloaliphatic hydrocarbons like cyclohexane and the aromatic hydrocarbon solvents such as benzene, toluene, xylene.

The production of prevailingly isotactic polypropylene having satisfactory impact resistance at low temperatures and containing from 1 to 20% by weight of polymerized ethylene is also carried out according to known methods.

According to such methods propylene is either polymerized in presence of small amounts of ethylene fed continuously or intermittently into the reactor or ethylene is polymerized after conversion of propylene into polypropylene of at least 80% is reached.

The regulation of the molecular weight of the polymer during the polymerization is also carried out according to known methods, operating, e.g., in the presence of alkyl halide, Zn or Cd organometallic compounds, or hydrogen. As already mentioned the presence of hydrogen as molecular weight regulator in the process according to this invention does not appreciably reduce the activity and/or stereospecificity of the catalysts.

The invention is explained by the following examples given only to illustrate and not to limit same. Unless otherwise specified, the percentages mentioned in the examples are expressed by weight; the inherent viscosity of the polymer $\eta_{in}$ was measured in tetralin at 135° C, using concentrations of 0.25 g polymer in 100 cm³ solvent.

EXAMPLE 1

9.6 g anhydrous $MgCl_2$ and 0.405 g $TiCl_4$ are milled for 16 hours in a nitrogen atomsphere in a ball mill (length 10 mm, diameter 50 mm; the surface area of the milled product is 19 m²/g). 0.2896 g of the so prepared product (containing 1% by wt. titanium) is suspended in the solution previously prepared by reacting for 10 minutes, in 50 ml n-heptane, 0.82 g $Al(C_2H_5)_3$ and 0.495 g tetramethylurea. The resulting suspension is introduced under pressure of dry argon into a 3 liter autoclave provided with an anchor stirrer, heated to 65° C and containing 880 g propylene. After 5 hours polymerization 40 g polymer are obtained corresponding to a yield at 24,200 g polymer/g titanium employed. The extraction with boiling n-heptane gives a residue of 67.3%. The inherent viscosity of the crude polymer is 1.92 dl/g.

EXAMPLE 2

The example 1 is repeated employing in this case 0.3094 g of the catalyst obtained by co-milling $MgCl_2$ and $TiCl_4$ and substituting the tetramethylurea by 0.77 g hexamethylphosphoramide. Following this procedure 290 g polymer are obtained corresponding to a yield of 94,000 g polymer/g titanium employed. The residue of the extraction with boiling n-heptane is 69.8%. The inherent viscosity of the crude polymer is 3.68 dl/g.

EXAMPLE 3

0.1198 g of the catalyst obtained by co-milling $MgCl_2$ and $TiCl_4$, described in example 1, is suspended in the solution previously prepared by reacting 0.665 g $Al(C_2H_5)_3$ and 0.492 g phthalic acid anhydride for 10 minutes in 50 ml n-heptane.

The resulting suspension is introduced, under pressure of dry argon, into a 2 liter autoclave provided with an anchor stirrer, heated to 65° C and containing 500 g propylene.

After 5 hours polymerization 159 g polymer are obtained corresponding to a yield of 132,500 g/g titanium employed. The residue of the extraction with boiling n-heptane is 52%.

EXAMPLE 4

11.564 g anhydrous $MgCl_2$ and 0.893 g of the 1:2 molar complex $TiCl_4$/tetrahydrofuran is milled for 16 hours as described in example 1.

0.3248 g of the so prepared catalyst (containing 1,03% by wt. titanium) are suspended in 290 ml n-heptane; to this suspension there is added the solution previously prepared by reacting 0.435 g $Al(C_2H_5)_3$ and 0.264 g diethyl ether for 15 minutes in 10 ml n-heptane. The resulting suspension is introduced, in a nitrogen atmosphere, into a 1 liter stainless steel shaking autoclave heated to 65° C. Then propylene is introduced up to the pressure of 8 atmospheres and both temperature and pressure (by feeding continuously the monomer for the duration of the run) are kept constant. After 5 hours the polymerization is stopped and, after treatment with a mixture 1:1 methanol-acetone, filtration and drying, 46 g polymer are obtained corresponding to a yield of 13,700 g polymer/g titanium employed. The extraction with boiling n-heptane gives a residue of 63%. The inherent viscosity of the crude polymer is 2.78 dl/g.

EXAMPLE 5

Example 4 is repeated employing in this case 0.3061 g of the catalyst obtained by co-milling $MgCl_2$ and the 1:2 molar complex $TiCl_4$/tetrahydrofuran and substituting the diethyl enther by 0.133 g tetrahydrofuran. Following this procedure 85 g polymer are obtained corresponding to a yield of 26,200 g polymer/g titanium employed. The extraction with boiling n-heptane gives a residue of 60.5%. The inherent viscosity of the crude polymer is 2.60 dl/g.

EXAMPLE 6

10.09 g anhydrous $MgCl_2$ and 0.76 g of the complex $TiCl_4.2C_2H_5OC_2H_5$ is milled for 16 hours as described in example 1.

0.1493 g of the so obtained supported catalyst (containing 1.03% by wt. titanium) are suspended in the solution previously prepared by reacting for 10 minutes, in 10 ml n-heptane, 0.665 g $Al(C_2H_5)_3$ and 0.370 g diethyl ether and diluting with 40 ml n-heptane. The resulting suspension is introduced, under pressure of inert gas, into a 2 liter autoclave provided with an anchor stirrer, heated to 65° C and containing 500 g propylene. After 6 hours polymerization 175 g polymer is obtained corresponding to a yield of 113,500 g polymer/g titanium employed. The residue of the extraction with boiling n-heptane is 62.8%. The inherent viscosity of the crude polymer is 2.48 dl/g.

EXAMPLE 7

10.10 g anhydrous $MgCl_2$ and 0.62 g of the 1:1 molar complex $TiCl_4$/tetrahydrofurfuryl methyl ether are milled for 16 hours as described in example 1.

By employing 0.1965 g of the so prepared catalyst (containing 0.953% by wt. titanium) and carrying out the polymerization of propylene in the same conditions as described in example 3, 70 g polymer are obtained corresponding to a yield of 37,600 g polymer/g titanium employed. The extraction with boiling n-heptane gives a residue of 77.3%. The inherent viscosity of the crude polymer is 4.9 dl/g.

EXAMPLE 8

9.27 g anhydrous $MgCl_2$ and 0.74 g $Cl_3Ti$—O—(2,4-,6-$C_6H_2Cl_3$) are milled for 16 hours as described in example 1.

0.1477 g of the so prepared mixture (containing 1% by wt. titanium) is employed for polymerizing propylene in the same conditions as described in example 6, with the exception that 1.64 g $Al(C_2H_5)_3$ and 0.97 g diethyl ether are used. Thus, 112 g polymer are obtained corresponding to a yield of 76,200 g polymer/g titanium employed. The residue of the extraction with boiling n-heptane is 68.7%.

EXAMPLE 9

9.77 g anhydrous $MgCl_2$ and 0.73 g $Cl_3TiN(C_6H_5)_2$ are milled for 16 hours following the procedure described in example 1.

By employing 0.162 g of the so prepared mixture (containing 1.03% by wt. titanium) for polymerizing propylene in the same conditions as described in example 8, 121 g polymer are obtained corresponding to a yield of 72,500 g polymer/g titanium employed. The extraction with boiling n-heptane gives a residue of 62.2%. The inherent viscosity of the crude polymer is 2.60 dl/g.

EXAMPLE 10

0.0537 g of the product obtained by co-milling $MgCl_2$ and $TiCl_3OCH_3$ (containing 5.2% by wt. titanium) are employed for polymerizing propylene in the same conditions as described in example 6, with the exception that 0.82 g $Al(C_2H_5)_3$ and 0.465 g diethyl ether are used. Thus, 70 g polymer are obtained corresponding to a yield of 25,000 g polymer/g titanium employed. The extraction with boiling n-heptane gives a residue of 65.2%. The inherent viscosity of the crude polymer is 2.85 dl/g.

EXAMPLE 11

0.1693 g of the catalyst obtained by co-milling $MgCl_2$ and $TiCl_4$, described in example 1, is suspended in the solution previously prepared by reacting 0.82 g $Al(C_2H_5)_3$ and 0.515 g pyridine for 10 minutes in 50 ml n-heptane.

The resulting suspension is injected, under pressure of dry argon, into a 1 liter shaking autoclave heated to 65° C and containing 300 g propylene. After 5 hours polymerization 110 g polymer are obtained corresponding to a yield of 65,000 g polymer/g titanium employed. The residue of the extraction with boiling n-heptane is 64%.

EXAMPLE 12

10.57 g anhydrous $MgCl_2$ and 0.45 g $TiCl_4$ are milled under the conditions described in Example 1. 0.1429 g of the mixture thus obtained (having a Ti content = 1.02% by weight) is employed for repeating Example 3 with the difference of replacing phthalic acid anhydride by 0.0065 g benzonitrile.

After 6 hours of polymerization 228 g polymer are obtained which correspond to a yield of 156,000 g/g Ti.

The residue to the extraction with boiling n-heptane is 64.8%. The inherent viscosity of the crude product is 1.85 dl/g.

EXAMPLE 13

12.042 g anhydrous $MgCl_2$ and 0.875 g of the complex $TiCl_4 \cdot C_6G_5COOC_2H_5$ are milled for 16 hours as described in Example 1. g 0.6132 benzoic acid suspended in 50 ml n-heptane is reacted with 1 ml $Al(C_2H_5)_3$ for 15 minutes; to the so obtained solution there is added 0.3118 g of the above described catalyst containing 0.974% Ti.

The so obtained suspension is injected into a 3 liter autoclave heated to 65° C and containing 880 g propylene.

After 6 hours the polymerization is stopped and 64 g polymer are isolated corresponding to a yield of 13,000 g/g Ti. The extraction with boiling n-heptane gives a residue of 84.5%. The inherent viscosity of the crude polymer is 3.48 dl/g.

EXAMPLE 14

0.1222 g of the catalyst obtained by co-milling $MgCl_2$ and $TiCl_4$, described in Example 1, is employed for polymerizing propylene in the same conditions as described in Example 6, with the exception that the diethyl ether complexed with $Al(C_2H_5)_3$ is substituted by 0.416 g phenyl isocyanate. After 5 hours polymerization 180 g polymer are obtained corresponding to a yield of 147,800 g polymer/g titanium employed. The residue of the extraction with boiling n-heptane is 55.8%.

EXAMPLE 15

0.1505 g of the catalyst obtained by co-milling $MgCl_2$ and $TiCl_4$, described in Example 1, is employed for polymerizing propylene in the same conditions as described in Example 11, with the exception that pyridine is substituted by 1.31 g tributyl phosphine.

Thus, 55 g polymer are obtained. The residue of the extraction with boiling n-heptane is 67%.

EXAMPLE 16

0.2880 g of the catalyst obtained by co-milling $MgCl_2$ and $TiCl_4$, described in Example 1, is employed for polymerizing propylene in the same conditions as described in Example 1, with the exception that tetramethylurea is substituted by 0.837 g diethyl sulfide. Thus, 350 g polymer are obtained. The residue of the extraction with boiling n-heptane is 52%.

EXAMPLE 17

11.777 g anhydrous $MgCl_2$ and 0.7924 g of the complex $TiCl_4 \cdot (CH_3)_2N-CH_2CH_2-N(CH_3)_2$ are milled in a nitrogen atmosphere for 16 hours in a glass mill (length 100 mm, diameter 50 mm) containing 550 g steel balls having a diameter of 9.5 mm. The surface area of the milled product was 8 $m^2$/g. 0.7697 g of the thus milled mixture (having a Ti content of 0.993 by weight) are suspended in the solution (previously prepared at room temperature and maintained at this temperature for 10') of 0.82 g $Al(C_2H_5)_3$ and 0.33 g tetramethylurea in 50 $cm^3$ anhydrous and deaerated n-heptane, and the thus obtained suspension is injected under pressure of dry argon, into a stainless steel autoclave having a 3 l capacity, provided with magnetic stirring, heated to the temperature of 65° and containing 900 g anhydrous propylene. Stirring is discontinued after 6 hours, the unpolymerized propylene is discharged and a white, pulverulent product is removed from the autoclave which, after drying, amounts to 250 g, corresponding to a yield of 40,000 g polymer per gram of titanium employed.

The extraction with boiling n-heptane gave a residue of 81%. The inherent viscosity of the crude polymer is 3.48 dl/g.

EXAMPLE 18 Example 1 is repeated using 0.596 g of the product obtained by milling together $MgCl_2$ and $TiCl_4 \cdot (CH_3)_2-N-CH_2-CH_2-N(CH_3)_2$ as described in example 1 and replacing tetramethylurea by 0.585 g diethyl sulfide. The surface are of the milled product was 13 $m^2$/g. The X-rays spectrum showed a broadening of the most intense diffraction lines characteristic of $MgCl_2$.

370 g polypropylene are obtained, which correspond to a yield of 62,000 g polymer per gram of titanium employed.

The extraction with boiling n-heptane gave a residue of 83%. The inherent viscosity of the crude polymer was 4.32 dl/g.

EXAMPLE 19

Example 1 is repeated using 0.579 g of the product obtained by milling together MgCl$_2$ and the Ti complex described in example 1 and replacing tetramethylurea by 0.73 g hexamethyl phosphoramide.

After 6 hours polymerization, 206 g polymer are obtained, which correspond to a yield of 34,000 g/g Ti.

The residue of extraction with boiling n-heptane is 82.5%. The inherent viscosity of the crude polymer is = 4.67 dl/g.

EXAMPLE 20

Example 1 is repeated using 0.595 g of the product obtained by milling together MgCl$_2$ with TiCl$_4$.(CH$_3$)$_2$—N—CH$_2$—CH$_2$—N(CH$_3$)$_2$ as described in example 1 and replacing tetramethylurea by 0.33 g (CH$_3$)$_2$—N—CH$_2$—CH$_2$—N (CH$_3$)$_2$.

407 g polypropylene are obtained, which correspond to a yield of 68,000 g/g Ti. The extraction with boiling n-heptane gave a residue of 87%.

The inherent viscosity of the crude polymer is = 5.25 dl/g.

EXAMPLE 21

9.583 g anhydrous MgCl$_2$ and 0.678 g of the complex TiCl$_4$.1,2,4-trimethylpiperazine are milled as described in example 1. 0.690 g of the thus milled mixture (having a Ti content of 1.000%) and a surface area of 26 m$^2$/g are used in the polymerization of propylene, operating as described in example 1, but substituting tetramethylurea with 0,426 g ethyl ether.

235 g polymer are obtained with a yield of 34,000 g/g Ti employed.

The inherent viscosity of the crude polymer is = 5.76.

The residue of boiling n-heptane amounts to 88%.

EXAMPLE 22

0.3055 g of the catalyst obtained by milling together MgCl$_2$ and TiCl$_4$.(CH$_3$)$_2$N—CH$_2$—CH$_2$—N(CH$_3$)$_2$ as described in example 1, are suspended in 290 cc n-heptane, to which a solution of 0.435 g Al(C$_2$H$_5$) and 0.325 g N(C$_2$H$_5$)$_3$ dissolved in 10 cm$^3$ n-heptane are added. The suspension is fed under a nitrogen atmosphere, into a stainless steel rocking autoclave having a 1 l capacity, kept at a temperature of 65° C. Propylene is then fed up to a pressure of 8 atm and the pressure is kept constant (by feeding the monomer continuously) and the temperature as well, for the whole duration of the run. After 5 hours, the polymerization is discontinued and, after treatment with a 1:1 mixture of acetone and methanol, filtration and drying, 44 g polymer, corresponding to a yield of 14,500 g/g Ti, are separated.

The extraction with boiling n-heptane gave a residue of 82.5%. The inherent viscosity of the crude polymer is 4.35 dl/g.

EXAMPLE 23

Example 6 is repeated, but using in this case 0.323 g supported catalyst, 0.41 g Al(C$_2$H$_5$)$_3$ and triethylamine is replaced by 0.165 g tetramethylurea.

53 g polymer, corresponding to a yield of 16,500 g/g Ti, are obtained.

The residue of the extraction with boiling n-heptane amounts to 81.5%.

The inherent viscosity of the crude polymer is = 3.84 dl/g.

EXAMPLE 24

Example 6 is repeated, but using in this case 0.315 g supported catalyst, 0.44 g Al(C$_2$H$_5$)$_3$ and triethylamine is replaced by 0.214 g ethyl ether. 49 g polymer are obtained, which correspond to a yield of 15,500 g/g Ti.

The residue of the extraction with boiling n-heptane amounts to 91.3%. The inherent viscosity of the crude polymer is = 3.98 dl/g.

EXAMPLE 25

11.796 g anhydrous MgCl$_2$ and 0.864 g of the complex TiCl$_4$.(CH$_3$)$_2$N—CH$_2$—CH$_2$—N(CH$_3$)$_2$ are milled as described in example 1. 0.586 g of the thus obtained mixture (having a Ti content of 1.07% by weight) are used to repeat example 1 replacing in this case tetramethylurea by 1.90 g tri-n-butyl phosphine. After 6 hours polymerization 490 g polymer are obtained, which correspond to a yield of 83,500 g/g Ti.

The residue of the extraction with boiling n-heptane is 82%.

The inherent viscosity of the crude polymer is 2.4 dl/g.

EXAMPLE 26

11.224 g anhydrous MgCl$_2$ and 0.834 g of the complex TiCl$_4$.(CH$_3$)$_2$N—CH$_2$—CH$_2$—N(CH$_3$)$_2$ are milled as described in example 1. 0.82 g of Al(C$_2$H$_5$)$_3$ and 0.33 g (CH$_2$)$_2$N—CH$_2$—CH$_2$—N(CH$_3$)$_2$ are added successively to 0.596 g of the thus obtained mixture (having a Ti content of 1.085% by weight), suspended in 50 cm$^3$ n-heptane and the thus obtained suspension is injected under pressure of dry argon into a stainless steel autoclave having a 3 l capacity provided with magnetic stirring, heated to a temperature of 65° C and containing 900 g anhydrous propylene.

After 6 hours polymerization, 360 g polymer are obtained, which correspond to a yield of 55,600 g/g Ti.

The extraction with boiling n-heptane gave a residue of 84.5%. The inherent viscosity of the crude polymer is =4.72 dl/g.

EXAMPLE 27

10.57 g anhydrous MgCl$_2$ and 0.45 g TiCl$_4$ are milled as described in example 1.

0.556 g of the thus milled mixture (having a Ti-content of 1.03% by weight) are suspended in a solution of 0.012 g (CH$_3$)$_2$—N—CH$_2$—CH$_2$—N(CH$_3$)$_2$ in 10 cm$^3$ n-heptane.

The whole is stirred for 45 minutes at room temperature, then the solution of 0.82 g Al(C$_2$H$_5$)$_3$ and 0.33 g (CH$_3$)$_2$—N—CH$_2$—CH$_2$—N(CH$_3$)$_2$ in 40 cm$^3$ n-heptane is added and the thus obtained suspension is injected under pressure of dry argon into a stainless steel autoclave having a 3 l capacity provided with magnetic stirring, heated to the temperature of 65° C and containing 900 g anhydrous propylene. After 5 hours polymerization 255 g polymer corresponding to a yield of 41,000 g/g Ti are obtained.

The extraction with boiling n-heptane gave a residue of 79%. The inherent viscosity of the crude polymer is = 5.94 dl/g.

EXAMPLE 28

11.224 g anhydrous MgCl$_2$ and 0.834 g of the complex TiCl$_4$.(CH$_3$)$_2$N—CH$_2$—CH$_2$—N(CH$_3$)$_2$ are milled as described in example 1.

0.6265 g of the thus obtained mixture (having a Ti content of 1.085% by weight) are suspended in the solution of 0.82 g Al($C_2H_5$)$_3$ and 0.428 g ethyl ether in 50 cm$^3$ anhydrous n-heptane (the solution was prepared at room temperature and maintained for 1 hour) and the thus obtained suspension is injected under pressure of dry argon into a stainless steel autoclave having a 3 l capacity provided with magnetic stirring, heated to the temperature of 65° C and containing 900 g anhydrous propylene and 1.35 l H$_2$. After 3.5 hours polymerization 545 g polymer are obtained, which correspond to a yield of 80,000 g/g Ti.

The extraction with boiling n-heptane gave a residue of 83.7%. The inherent viscosity of the crude polymer is = 2.28 dl/g.

EXAMPLE 29

11.224 g anhydrous MgCl$_2$ and 0.834 g of the complex TiCl$_4$.(CH$_3$)$_2$N—CH$_2$—CH$_2$—N(CH$_3$)$_2$ are milled as described in example 1.

0.560 g of the thus obtained mixture (having a Ti content of 1.085% by weight) are suspended in the solution of 0.82 g Al(CH$_2$H$_5$)$_3$ and 0.75 g ethyl ether in 50 cm$^3$ anhydrous n-heptane and the thus obtained suspension is injected under pressure of dry argon, into a stainless steel autoclave having a 3 l capacity provided with magnetic stirring, heated to a temperature of 65° C and containing 900 g anhydrous propylene.

After 5 hours polymerization 108 g polymer are obtained, which correspond to a yield of 17,800 g/g Ti. The extraction with boiling n-heptane gave a residue of 90%. The inherent viscosity of the crude polymer is = 5.9 dl/g.

EXAMPLE 30

13.9344 g anhydrous MgCl$_2$ and 0.9595 g of the complex TiCl$_4$.(CH$_3$)$_2$N—CH$_2$—CH$_2$—N(CH$_3$)$_2$ are milled together as described in example 1.

0.3925 of the thus obtained mixture (having a Ti content of 1.01% by weight) are suspended in the solution of 0.82 g Al(C$_2$H$_5$)$_3$ and 0.254 g of CH$_3$NH—CH$_2$—CH$_2$—NHCH$_3$ in 50 cm$^3$ anhydrous n-heptane and the thus obtained suspension is injected under pressure of dry argon, into a stainless steel autoclave having a 1 l capacity, heated to 65° C and containing 340 g anhydrous propylene. After 5 hours reaction, 93 g polypropylene are separated which correspond to a yield of 23,500 g/g Ti. The extraction with boiling n-heptane gave a residue of 86%. The inherent viscosity of the crude polymer is 5.28 dl/g.

EXAMPLE 31

14.09 g anhydrous MgCl$_2$ and 0.9745 g of the complex TiCl$_3$.(CH$_3$)$_2$N—CH$_2$—CH$_2$—N(CH$_3$)$_2$ are milled together as described in example 1. 0.4842 g of the thus obtained mixture (having a Ti content of 1.15%) are suspended in the solution of 0.82 g Al(C$_2$H$_5$)$_3$ and 0.33 g N,N,N',N',-tetramethylethylendiamine in 50 cm$^3$ anhydrous n-heptane and the thus obtained suspension is injected under pressure of dry argon into a stainless steel autoclave having a 1 l capacity, heated to a temperature of 65° C and containing 310 g anhydrous propylene. After 5 hours polymerization 100 g polymer are separated, which correspond to a yield of 18,000 g/g Ti. The extraction with boiling n-heptane gave a residue of 77%. The inherent viscosity of the crude polymer is 5.92 dl/g.

EXAMPLE 32

11.224 g anhydrous MgCl$_2$ and 0.8337 g of the complex TiCl$_4$.(CH$_3$)$_2$N—CH$_2$—CH$_2$—N(CH$_3$)$_2$ are milled together as described in example 1. 0.3418 g of the thus obtained mixture (having a Ti content of 1.085% by weight) are suspended in the solution of 0.82 g Al(C$_2$H$_5$)$_3$ and 0.257 g acetophenone in 50 cm$^3$ anhydrous n-heptane and the thus obtained suspension is injected under pressure of dry argon, into a stainless steel autoclave having a 1 liter capacity, heated to a temperature of 65° C and containing 285 g anhydrous propylene. After 5 hours polymerization, 171 g polymer are obtained, which correspond to a yield of 46,000 g/g Ti.

The extraction with boiling n-heptane gave a residue of 79.5%. The inherent viscosity of the crude polymer is = 4.76 dl/g.

EXAMPLE 33

13.1589 anhydrous MgCl$_2$ and 0.915 g of the complx TiCl$_4$.(CH$_3$)$_2$N—CH$_2$—CH$_2$—N(CH$_3$)$_2$ are milled in nitrogen atmosphere for 16 hours under the conditions described in example 1.

0.5809 g of the thus obtained mixture (having Ti content of 1,02%) are employed for repeating example 1 with the difference of replacing tetramethylurea by 0.0396 g CH$_3$COCH$_3$. After 6 hours polymerization 570 g polymer are obtained corresponding to a yield of 96,500 g/g Ti. The residue to the extraction with boiling n-heptane is 75.5%. The inherent viscosity of the crude product is 2.35 dl/g.

EXAMPLE 34

9.583 g anhydrous MgCl$_2$ and 0.678 g of the complex TiCl$_4$.1,2,4 trimethylpiperazine are milled as described in Example 1. 0.3916 g of the thus obtained mixture (having a Ti content of 1.0% by weight) are employed to polymerize propylene under the conditions of example 1 but replacing tetramethylurea by 0.470 g 1,2,4 trimethylpiperazine. 240 g polymer are obtained with yield of 64,500 g/g Ti. The residue to the extraction with n-heptane is = 77%. The inherent viscosity of the crude polymer is = 4.60 dl/g.

EXAMPLE 35

10.7525 g of anhydrous MgCl$_2$ and 0.749 g of the complex TiCl$_4$.(CH$_3$)$_2$N—CH$_2$CH$_2$—N(CH$_3$)$_2$ are milled for 16 hours as described in example 1.

To the solution of 2 ml Al(C$_2$H$_5$)$_3$ in 40 ml n-heptane it is added dropwise the solution of 0.515 ml ethanol in 10 ml n-heptane; to this solution it is added 0.1675 g of the above described catalyst containing 1.02% itanium.

The so-obtained suspension is injected into a 3 liter autoclave heated to 65° C and containing 920 g propylene.

After 6 hours the polymerization is stopped and 225 g polymer are isolated corresponding to a yield of 130,000 g/g Ti. The extraction with boiling n-heptane gives a residue of 62.3%. The inherent viscosity of the crude polymer is 2.5 dl/g.

EXAMPLE 36

11.2 g anhydrous MgCl$_2$ and 0.7555 g of the complex TiCl$_4$.(CH$_3$)$_2$N—CH$_2$CH$_2$—N(CH$_3$)$_2$ are milled for 16 hours following the procedure of example 1.

0.2931 g of the so prepared catalyst (containing 0.991% by weight titanium) are employed for polymerizing propylene in the same conditions as described in example 6, with the exception that triethylamine is substituted by 0.378 g dibutyl ether. Thus, 80 g polymer are obtained corresponding to a yield of 276,000 g polymer/g titanium employed.

The residue of the extraction with boiling n-heptane is 76.5%.

EXAMPLE 37

11.3913 g anhydrous $MgCl_2$ and 0.7853 g of the complex $TiCl_4 \cdot (CH_3)_2N-CH_2CH_2-N(CH_3)_2$ are milled for 16 hours following the procedure of example 1.

0.1923 g of the so obtained product (containing 1.01% by weight titanium) are employed for polymerizing propylene in the same conditions as described in example 6, with the exception that triethylamine is substituted by 0,35 g ethyl phenyl ether. Thus, 48 g polymer are obtained corresponding to a yield of 24,600 g polymer/g titanium employed.

The extraction with boiling n-heptane gives a residue of 69%.

EXAMPLE 38

9.291 g anhydrous $MgCl_2$ and 0.6620 g of the 1:1 molar complex $TiCl_4$/1.4-dimethylpiperazine are milled for 16 hours following the procedure of example 1.

0.82 g $Al(C_2H_5)_3$ and 0.43 g diethylether are reacted in 10 ml n-heptane for 10 minutes; the resulting solution is diluted with n-heptane up to 1000 ml and, after addition of 0.6133 g of the supported catalyst prepared as above described (containing 1,05% by weight titanium), is introduced into a 3 liter autoclave heated to 55° C; 800 g propylene are then introduced and it is stirred for 7 hours keeping the temperature constant. Thus 112 g polymer are isolated corresponding to a yield of 17,400 g polymer/g titanium employed. The extraction with boiling n-heptane gives a residue of 77.2%. The inherent viscosity of the crude polymer is 4.68 dl/g.

EXAMPLE 39

13.9684 g anhydrous $MgCl_2$ and 0.9770 g of the complex $TiCl_4 \cdot (C_2H_5)_2N-CH_2CH_2-N(C_2H_5)_2$ are milled for 16 hours following the procedure of example 1.

0.2757 g of the so prepared catalyst (containing 0.87% by weight titanium) are employed for polymerizing propylene following the same procedure as described in example 6. 21 g polymer are obtained, the residue of which to the extraction with boiling n-heptane is 76%.

EXAMPLE 40

9.6 g anhydrous $MgCl_2$ and 0.405 g $TiCl_4$ are milled for 16 hours as described in example 1.

0.2893 g of the so prepared product (containing 1% by weight titanium) are employed for polymerizing propylene following the procedure of example 1, with the exception that tetramethylurea is substituted by 0.334 g N,N,N',N'-tetramethylethylenediamine. After 5 hours polymerization 280 g polymer are obtained, the residue of which to the extraction with boiling n-heptane is 63.5%.

EXAMPLE 41

Example 24 is repeated employing in this case 0.3039 g of the catalyst obtained by co-milling $MgCl_2$ and $TiCl_4$ and substituting tetramethylethylenediamine by 0.35 g 2-dimethylaminopyridine. Thus, 70 g polymer are obtained, the residue of which to the extraction with boiling n-heptane is 60.5%. The inherent viscosity of the crude polymer is 2.70 dl/g.

EXAMPLE 42

Example 24 is repeated employing in this case 0.2578 g of the catalyst obtained by co-milling $MgCl_2$ and $TiCl_4$ and substituting tetramethylethylenediamine by 0.470 g N,N,N',N'-tetramethyl-o-phenylenediamine. Thus, 78 g polymer are obtained, the residue of which to the extraction with boiling n-heptane is 65%. The inherent viscosity of the crude polymer is 2.48 dl/g.

What we claim is:

1. Process for the stereoregular polymerization of alpha-olefins of the formula $CH_2 = CHR$ wherein R is an alkyl radical having 1-6 carbon atoms and mixtures thereof with ethylene, which process comprises polymerizing the olefins in contact with a catalyst the starting catalyst-forming components of which comprise the following components (A) and (B):

(A) the addition and/or substitution reaction product of an electron-donor compound (or Lewis base) free from ester groups of oxygenated organic and inorganic acids with an Al-trialkyl compound or the addition reaction product of said electron-donor compound with an Al-alkyl compound containing two or more Al atoms linked together through an oxygen or a nitrogen atom, component (A) being characterized in that the amount of Al-alkyl compound present as addition compound with the electron-donor compound ranges from 0.01 to 1 mole per mole of the starting Al compound and in that the Al-compound present as substitution compound ranges from 0.01 to 0.9 moles per mole of the starting Al-compound; and (B) the product obtained by contacting a Ti compound selected from the group consisting of the halogenated bi-, tri-, and tetravalent Ti compounds and complexes of said Ti compounds with an electron-donor compound, with a support comprising an anhydrous Mg or Mn bihalide in an active state such that the X-rays powder spectrum of component (B) does not show the most intense diffraction lines as they appear in the X-rays powder spectrum of normal non-activated Mg or Mn bihalides, the X-rays powder spectrum of component (B) showing a broadening of said most intense diffraction lines, component (B) being further characterized in that the Ti compound present therein, expressed as Ti metal, is less than 0.3 g atom per mole of the total amount of the electron-donor compound present in a combined form in the catalyst and the catalyst being additionally characterized in that the Al/Ti molar ratio is from 10 to 1,000.

2. The process of claim 1, in which component (A) of the catalyst is an addition reaction product of an Al-trialkyl compound with the electron-donor compound.

3. The process of claim 2, in which the addition reaction product is prepared from an Al-trialkyl compound and an electron-donor compound which is a monoamino compound.

4. The process of claim 2, in which the addition reaction product is prepared from an Al-trialkyl compound and an electron-donor compound which is a polyamino compound.

5. The process of claim 1, in which component (A) of the catalyst is a substitution reaction product of an Al-trialkyl compound with the electron-donor compound.

6. The process of claim 5, in which the substitution reaction product is prepared from an Al-trialkyl compound and an electron-donor compound which is a mono-amino compound.

7. The process of claim 5, in which the substitution reaction product is prepared from an Al-trialkyl compound and an electron-donor compound which is a polyamino compound.

8. The process of claim 2, in which the Al-trialkyl compound present in a combined form with the electron-donor compound is in an amount ranging from 0.3 to 0.5 mole per mole of the starting Al-trialkyl.

9. The process of claim 1, in which the anhydrous Mg or Mn bihalide is activated by cogrinding thereof with the halogenated Ti compound.

10. The process of claim 1, in which the anhydrous Mg or Mn bihalide is preactivated before it is contacted with the halogenated Ti compound.

11. The process of claim 10, in which the anhydrous Mg or Mn bihalide is preactivated by grinding.

12. The process of claim 10, in which the Mg or Mn bihalide is preactivated by reacting an addition compound thereof with an electron-donor compound with an Al-trialkyl, the molar ratio between the Al-trialkyl and the electron-donor compound being higher than 1.

13. The process of claim 1, in which the anhydrous Mg bihalide is $MgCl_2$.

14. The process of claim 1, in which the anhydrous Mg bihalide is $MgBr_2$.

15. The process of claim 1, in which the anhydrous Mn bihalide is $MnCl_2$.

16. The process of claim 1, in which the anhydrous Mn bihalide is $MnBr_2$.

17. The process of claim 1, in which the anhydrous Mg bihalide is $MgCl_2$ preactivated by reacting an addition compound of $MgCl_2$ and an electron-donor compound with an Al-trialkyl, the molar ratio between the Al-trialkyl and the electron-donor compound being higher than 1.

18. The process of claim 1, in which the anhydrous Mg bihalide is $MgBr_2$ preactivated by reacting an addition compound of $MgBr_2$ and an electron-donor compound with an Al-trialkyl, the molar ratio between the Al-trialkyl and the electron-donor compound being higher than 1.

19. The process of claim 1, in which the anhydrous Mn bihalide is $MnCl_2$ preactivated by reacting an addition compound of $MnCl_2$ and an electron-donor compound with an Al-trialkyl, the molar ratio between the Al-trialkyl and the electron-donor compound being higher than 1.

20. The process of claim 1, in which the anhydrous Mn bihalide is $MnBr_2$ preactivated by reacting an addition compound of $MnBr_2$ and an electron-donor compound with an Al-trialkyl, the molar ratio between the Al-trialkyl and the electron-donor compound being higher than 1.

21. The process of claim 1, in which the Ti compound is $TiCl_4$.

22. The process of claim 1, in which the Ti compound is $TiCl_3$.

23. The process of claim 10 in which the Ti compound is $TiCl_4$.

24. The process of claim 11 in which the Ti compound is $TiCl_4$.

25. The process of claim 1, in which the electron-donor compound free of ester groups of oxygenated organic and inorganic acids is a mono-amino compound.

26. The process of claim 1, in which at least one of components (A) and (B) is prepared from an electron-donor compound which is a polyamino compound.

27. The process of claim 2, in which the addition reaction product is prepared from an Al-trialkyl and an electron-donor compound containing two or more donor-atoms.

28. The process of claim 2 in which the electron donor compound is a diether, a phosphoramide, or an alkylurea.

29. The process of claim 2 in which the electron-donor compound is an ether, thioether or a ketone.

30. The process of claim 1, in which the Ti compound is present in the catalyst in an amount, expressed as Ti metal, of less than 0.1 g-atom per mole of the total amount of electron-donor compound present in the catalyst.

31. The process of claim 1, in which the Ti compound is present in the catalyst in an amount, expressed as Ti metal, of from 0.005 to 0.05 g-atom per mole of the total amount of electron-donor compound present in the catalyst.

32. The process of claim 1, in which the amount of Ti compound present in the catalyst, expressed as Ti metal, is from 0.1% to 10% by weight.

33. The process of claim 1, in which the alpha-olefin is propylene and is polymerized in liquid phase in the substantial absence of an inert diluent.

34. The process of claim 1, in which the alpha-olefin is propylene and is polymerized in the presence of hydrogen as molecular weight regulator.

* * * * *

UNITED STATES PATENT OFFICE
CERTIFICATE OF CORRECTION

Patent No. __4,107,413__  Dated __August 15, 1978__

Inventor(s) __Umberto GIANNINI et al__

It is certified that error appears in the above-identified patent and that said Letters Patent are hereby corrected as shown below:

__Col. 4__ - __line 22__     the word - - - are - - - should be inserted between "N atom" and "obtained".

__Col. 5__ - __line 42__     the formula printed as:

"$TiCl_3(CH_3)_2N-CH_2)\ N(CH_3)_2$" should read

- - - $TiCl_3(CH_3)_2N-(CH_2)_2N(CH_3)_2$ - - -.

__Col. 5__ - __line 43__     the formula printed as:

"$TiCl_4(CH_3)_2N(CH_{N)}\ \ \ _2)_2N(CH_3)_2TiCl_4$" should read

- - - $TiCl_4(CH_3)_2N(CH_2)_2N(CH_3)_2TiCl_4$ - - -.

__Col. 5__ - __lines 44-45__     the formula printed as:

"$TiCl_3.C_6H_5COOC_2H_5$" should read

- - - $TiCl_3.C_6H_5COOC_2H_5$ - - -.

__Col. 8__ - __line 7 of Example 7__     After "example" the numeral "3" should be - - - 6 - - -.

UNITED STATES PATENT OFFICE

CERTIFICATE OF CORRECTION

Patent No. 4,107,413  Dated August 15, 1978

Inventor(s) Umberto GIANNINI et al

It is certified that error appears in the above-identified patent and that said Letters Patent are hereby corrected as shown below:

Col. 9 - line 2 of Example 13  the formula printed as:

"$TiCl_4 \cdot C_6G_5COOC_2H_5$" should read

- - - $TiCl_4 \cdot C_6H_5COOC_2H_5$ - - -.

Col. 11 - line 4 of Example 22  the formula printed as:

"$Al(C_2H_5)$"  should read

- - - $Al(C_2H_5)_3$ - - -.

Col. 12 - line 6 of Example 25  After "by" the quantity

"1.90 g" should be - - - 1.09 g. - - -.

Col. 13 - line 4 of Example 28

The quantity "0.6265 g" should be

- - - 0.625 g. - - -.

UNITED STATES PATENT OFFICE
CERTIFICATE OF CORRECTION

Patent No. 4,107,413      Dated August 15, 1978

Inventor(s) Umberto GIANNINI et al

It is certified that error appears in the above-identified patent and that said Letters Patent are hereby corrected as shown below:

<u>Col. 14 - line 1 of Example 33</u>

"Complx" should be - - - complex - - -.

Signed and Sealed this

Thirteenth Day of May 1980

[SEAL]

Attest:

SIDNEY A. DIAMOND

Attesting Officer     Commissioner of Patents and Trademarks